United States Patent [19]

Manfroni

[11] Patent Number: 4,476,146
[45] Date of Patent: Oct. 9, 1984

[54] METHOD OF PASTEURIZING AN EDIBLE FROZEN CONGEALED IN MACHINES PROVIDED WITH GAS-COMPRESSION REFRIGERATING CIRCUIT

[76] Inventor: Ezio Manfroni, 56, Via Altopiano, Sasso Marconi, Bologna, Italy

[21] Appl. No.: 348,296

[22] Filed: Feb. 12, 1982

[30] Foreign Application Priority Data

Feb. 27, 1981 [IT] Italy .................. 12451 A/81

[51] Int. Cl.³ .................. A23C 3/02; A23C 3/04; A23G 9/04; A23G 9/30
[52] U.S. Cl. .................. 426/522; 62/278; 62/342; 62/352; 99/453; 99/455; 426/521; 426/524
[58] Field of Search .......... 62/352, 306, 278, 342; 426/521, 524, 522; 99/453, 455

[56] References Cited

U.S. PATENT DOCUMENTS

| | | | |
|---|---|---|---|
| 3,034,310 | 5/1962 | Lowe | 62/352 |
| 3,059,444 | 10/1962 | Bickel et al. | 62/352 |
| 3,171,267 | 3/1965 | Mitchell | 62/352 |
| 3,183,681 | 5/1965 | Lutz et al. | 62/342 |
| 3,213,637 | 10/1965 | Halls | 62/352 |
| 3,667,244 | 6/1972 | Hock et al. | 62/352 |
| 3,733,840 | 5/1973 | Pearl et al. | 62/78 |
| 3,811,494 | 5/1974 | Menzel | 62/342 |
| 3,823,571 | 7/1974 | Smith et al. | 62/352 |
| 3,858,498 | 1/1975 | Swenson | 62/342 |
| 3,930,535 | 1/1976 | Menzel | 62/342 |
| 3,961,494 | 6/1976 | Schaefer et al. | 62/352 |
| 4,075,863 | 2/1978 | Wilson | 62/352 |
| 4,094,168 | 6/1978 | Hamner et al. | 62/352 |

Primary Examiner—Steven L. Weinstein

[57] ABSTRACT

The circuit of a gas-compression refrigerating unit in ice-cream making machines and/or ice-cream mixture pasteurizing machines has inserted therein a by-pass circuit controlled by one or more switching valves. During the cycle of pasteurization and/or sterilization of the ice-cream mixture and of the elements of the machine contacting said mixture (either liquid or frozen), the hot refrigerant gas coming from the compressor is diverted through the evaporator (by-passing both the condenser and expansion valve) so as to heat to a sterilization temperature all the elements of the apparatus which usually are cooled by said evaporator. On completion of this pasteurization and/or sterilization cycle, said by-pass circuit in shut off and the refrigeration cycle is resumed by switching said valves, whereby the fluid refrigerant is circulated from the compressor to the condenser and expansion valves into the evaporator so as to refrigerate the elements that are in heat exchange relationship with said evaporator.

1 Claim, 2 Drawing Figures

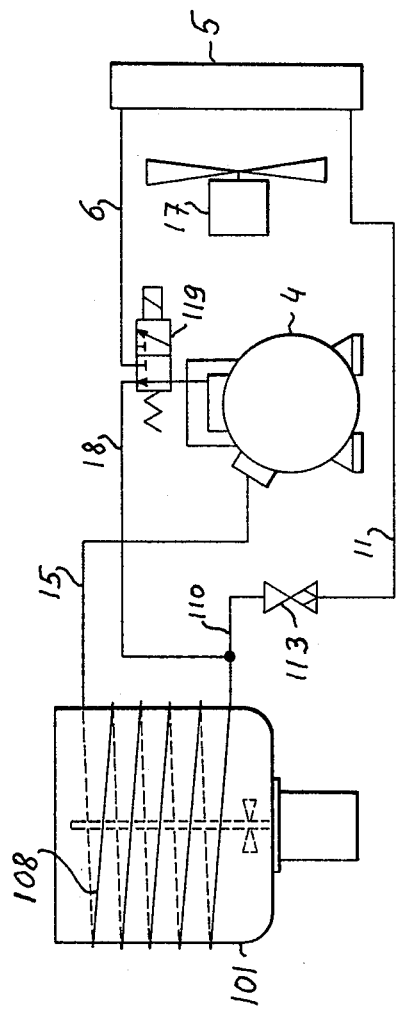

METHOD OF PASTEURIZING AN EDIBLE FROZEN CONGEALED IN MACHINES PROVIDED WITH GAS-COMPRESSION REFRIGERATING CIRCUIT

BACKGROUND AND SUMMARY OF THE INVENTION

This invention relates to machines for pasteurizing alimentary liquids and/or for making ice-cream or similar frozen congealed products, said machines being equipped with gas-compression refrigerators.

More particularly, the invention relates to a method of pasteurizing said liquids or ice-cream products within said machines, and of sterilizing the elements of the machine contacting said liquids and ice-cream products.

One of the most hard problems in the field of ice-cream making machines of non-industrial type, namely those machines for a relatively limited daily production (such as the machines for the production and distribution of "express" ice-creams to consumers, the pasteurizing machines and the like), is the problem of sterilizing all the elements of the machine contacting the ice-cream and/or ice-cream mixture, such as the mixture feeding tank and conduits and the members associated therewith, the freezing cylinder and conduits and members associated therewith, the emulsifying and mixing pumps, and the like.

Another problem related to these machines and to this type of production is the pasteurization and preservation in sterilized conditions of the mixture, either liquid or turned into ice-cream, remaining in the machine in the periods of rest or preservation, for example from the evening of one day to the morning of the day after.

These problems can be solved partially by washing the machine every day; however, this washing does not assure always the desired results, due to the difficulty to reach some elements of the machine (such as conduits, pumps, etc.) and because said washing entails the loss of the product left in the machine.

It has been proposed, for example, as described in the Italian Patent No. 736656, to effect said sterilization by arranging, in the freezing cylinder and in the mixture feeding tank, suitable electrical heating resistances to heat the contents of said elements to bacteria-killing temperatures.

However, the arrangement of electrical resistances contacting directly the feeding tank and the freezing cylinder gives rise to problems the technical solution of which is not easy.

The object of this invention, therefore, is to overcome the drawbacks of the conventional ice-cream making machines by providing a system permitting, in a simple and economic way and with no substantial modification of the machine, to heat the liquid mixture and the ice cream and all the parts of the machine contacting the ice-cream and/or the liquid mixture to bacteria-killing temperatures.

Under one aspect, this invention relates to a method of pasteurizing ice-cream and mixtures for ice-cream and of sterilizing the elements of the ice-cream making machines (or of pasteurizers) contacting said mixtures and ice-cream, which is applicable to the machines that are provided with gas-compression refrigerating units, comprising the steps of conveying the hot compressed gas coming from the compressor through the evaporator (or evaporators) of the refrigeration circuit arranged in heat-exchange relationship with the elements of the machine to be sterilized, by-passing the condenser and expansion valve (or valves) of said refrigeration circuit; of permitting this compressed gas to flow through said evaporator to reach the desired sterilization temperatures in the machine; and of resuming the refrigeration cycle by re-inserting the condenser and expansion valve (or valves) in the circuit and by excluding the by-pass circuit.

Another object of this invention is to provide a machine for carrying said method into effect, characterized in that inserted between the delivery conduit of the compressor and the evaporator of the refrigerator (in heat exchange relationship with the elements of the machine to be subjected to heat) is a by-pass circuit for the condenser and expansion valve (or valves) of the refrigerating circuit, controlled by one or more switching valves.

BRIEF DESCRIPTION OF THE DRAWINGS

Further characteristics and advantages of this invention will be apparent in the following description, made with reference to the accompanying drawings, wherein:

FIG. 2 is a diagrammatic view of an ice-cream mixture pasteurizer provided with a circuit according to the invention.

DESCRIPTION OF THE PREFERRED EMBODIMENT

Figure 1:
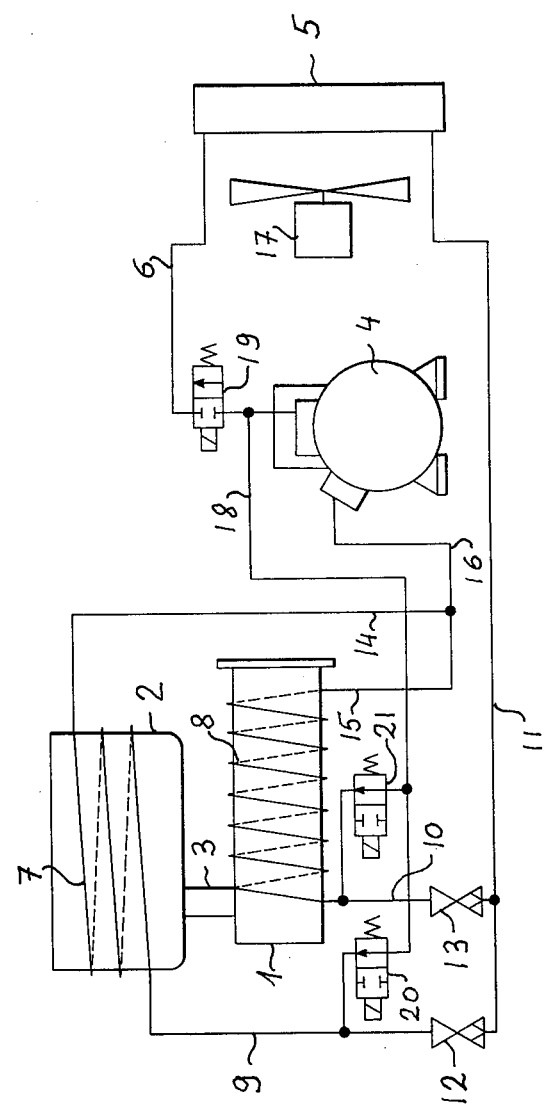
FIG. 1 is a diagrammatic view of an ice-cream making machine provided with the circuit according to the invention.

With reference to the drawings, and particularly to FIG. 1 thereof, the illustrated ice-cream making machine comprises, conventionally, a freezing cylinder 1 provided at the front thereof with ice-cream dispensing means (not shown), and provided in the interior thereof with a suitable stirrer (not shown). Secured above the cylinder 1 is a tank 2 containing the ice-cream liquid mixture and communicating through a duct 3 (having interposed therein, if desired, a suitable feed-pump) with the cylinder 1. The compressor of a gas-compression refrigerating unit is indicated with 4. Said refrigerating unit comprises, conventionally, a condenser 5 connected to the delivery side of the compressor through a conduit 6, a first evaporator 7 in heat exchange relationship with the tank 2, a second evaporator 8 in heat exchange relationship with the freezing cylinder 1, connected through pipings 9 and 10, respectively, to the delivery manifold 11 coming from the condenser 5, through respective expansion valves 12 and 13.

The evaporators 7 and 8, on turn, are connected with their outlets, through the pipings 14 and 15, to a manifold 16 connected to the suction of the compressor 4. An electric fan 17 effects the cooling of the condenser 5.

According to the invention, the compressor delivery pipe 6 is connected through a pipe 18 to the pipings 9 and 10 leading into the evaporators 7 and 8 through suitable shut-off valves. In detail, 19 indicates a valve inserted in the delivery of the compressor 4 upstream of the condenser 5; and 20 and 21 indicate two electrically-operated valves inserted in the circuit leading to the evaporators 7 and 8 downstream of the expansion valves 12 and 13. Thus, in one position of the valves 19, 20, 21 (heating position shown in FIG. 1), the condenser 5 and expansion valves 12 and 13 are by-passed;

whereas in a second position of the valves 19, 20, 21 (refrigerating position) the piping 18 is by-passed.

The operation of the circuit described above is apparent. With the valves 19, 20, 21 in the refrigerating position (non shown) the machine operates as a conventional ice-cream making machine: the gas refrigerant flows from the compressor 4 through conduit 6, condenser 5, conduit 11 and expansion valves 12 and 13 into the evaporators 7 and 8, effecting the cooling thereof, and thence it flows through the conduits 14 and 15 and manifold 16 back into the compressor 4.

With the valves 19, 20, 21 in the heating position, shown in FIG. 1, the hot refrigerant gas flows from the delivery side of the compressor 4 through the pipe 18, valves 20 and 21 and pipes 9 and 10 into the evaporators 7 and 8, so as to heat both the tank 2 and cylinder 1, and therefrom it flows back through pipes 14 and 15 and manifold 16 back to the compressor 4; in other words, with the valves 19, 20, 21 in heating position, the condenser 5 and expansion valves 12 and 13 will be by-passed.

In the latter case, the compressed gas delivered by the compressor behaves as a heating fluid for heating the elements that are in heat-exchange relationship with evaporators 7 and 8. This heating is proceeded until said elements and ice-cream mixture (either liquid or frozen) have reached a bacteria-killing temperature.

Obviously, by virtue of thermal conduction, all the portions contacting the mixture in cylinder 1 and tank 2 will be heated to said temperature, whereby a thorough sterilization of all the desired portions will be obtained. Once the desired temperature has been reached, the valves 19, 20, 21 are switched again to the refrigeration position, whereby the hot mixture in the tank 2 and cylinder 1 will be subjected first to cooling, thus completing the pasteurizing cycle, and then (in the cylinder 1) to freezing into ice-cream.

Thus, all the drawbacks of the conventional machines will be eliminated, without requiring any expensive and/or technically difficult modifications to the existing machines.

In fact, the same refrigerating circuit and the same essential components thereof are also used to heat to a sterilization temperature the mixture and the components of the machine in contact therewith.

FIG. 2 shows another embodiment of the invention, wherein the diagrammatic sterilization circuit is illustrated as applied to a pasteurizer for alimentary liquids, for example a pasteurizer for ice-cream liquid mixtures.

In FIG. 2, the components similar or equivalent to those of FIG. 1 are indicated by the same numerals. The pasteurizing tank 101, provided conventionally with stirrer, recirculating pump, etc., is in heat-exchange relationship with the evaporator 108 of the refrigerating unit comprising a compressor 4, a condenser 5 and expansion valve 113. The numeral 18 indicates the by-pass circuit for short-circuiting the condenser 5 and expansion valve 113. The numeral 119 indicates the electrically-operated valve for switching the refrigerating circuit. With the valve 119 in the heating position shown in the drawing, the hot compressed gas delivered by the compressor 4 flows through the pipe 18, evaporator 108 and pipe 15 back to the suction of compressor 4, so as to by-pass the condenser 5 and expansion valve 113. The tank 101 (and contents therein) will be thus heated to the desired sterilization temperature.

On completion of the heating cycle, the valve 119 is switched into the "refrigeration" position, whereby the refrigerant fluid delivered by the compressor 4 flows through the pipe 6 to the condenser 5 and thence through the pipe 11, expansion valve 113 into the evaporator 108, thus cooling the tank 101, and flows back to the compressor 4 through the pipe 15. The refrigeration cycle is thus resumed.

Obviously, in a circuit of the type described above, an ice-cream freezing tank could be substituted for the pasteurizing tank 101.

In this specification and in the following claims, the term "ice-cream making machine" means not only a machine for making ice-creams proper, but also a machine for making other similar frozen congealed products, such as milk shakes, rock ice-creams, and the like.

The term "pasteurization" or "sterilization" means a heat treatment consisting of heating and successive cooling, to temperatures and for periods of time such as to cause the destruction of the bacteria that can develop in ice-cream making machines in the usual operating conditions.

Therefore, this invention is not limited to the embodiments here shown and described, which are given only as a non-limitating example of preferred embodiments of the method according to the invention, but comprises all changes and modifications within the broadest scope of the inventive principle, substantially as claimed hereinafter.

I claim:

1. A method of pasteurizing an edible liquid mixture congealable upon freezing to form a frozen congealed product in an apparatus for making ice cream or similar edible frozen congealed products wherein said apparatus includes a compressor having delivery and suction ports; a first conduit extending from the delivery port; a condenser connected on one side to the first conduit; an expansion valve; an evaporator, said evaporator being connected on an inlet side to the side of the condenser opposite the connection to the first conduit through the expansion valve and on the other side to the suction port of the compressor, said evaporator being in heat exchange relationship with a chamber containing said edible mixture; a by-pass conduit extending from the delivery port of the compressor, said inlet side of the evaporator being in selective fluid communication with said by-pass conduit so that said by-pass conduit by-passes said expansion valve; and switching means for selectively establishing fluid communication between the delivery port of the compressor and either the first or by-pass conduit, the method comprising the steps of:

(a) establishing fluid communication between the delivery port of the compressor and the first conduit;

(b) directing hot compressed gases from the compressor through the first conduit serially through the condenser, the expansion valve, the evaporator and back to the suction port of the compressor to refrigerate the chamber containing said edible mixture;

(c) activating the switching means to establish fluid communication between the delivery port of the compressor and the by-pass conduit;

(d) directing hot compressed gases from the compressor through the by-pass conduit through the evaporator and back to the suction port of the compressor for a time and at a temperature to heat the contents of the chamber containing said edible mixture and components of the apparatus in contact therewith to a bacteria killing temperature; and (e) repeating steps (a) and (b).

* * * * *